(12) United States Patent
Ling

(10) Patent No.: US 9,026,118 B2
(45) Date of Patent: May 5, 2015

(54) MULTI-STANDARD COVERAGE MAP GENERATION

(75) Inventor: Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 446 days.

(21) Appl. No.: 13/588,769

(22) Filed: Aug. 17, 2012

(65) Prior Publication Data
US 2014/0051347 A1 Feb. 20, 2014

(51) Int. Cl.
H04W 40/00 (2009.01)
H04W 72/04 (2009.01)

(52) U.S. Cl.
CPC .................................. *H04W 72/044* (2013.01)

(58) Field of Classification Search
CPC ..... H04W 88/04; H04W 72/04; H04W 84/06; H04W 84/12; H04W 24/00; H04W 16/00; H04W 16/20; H04W 24/08; H04W 24/02; H04W 88/06; H04W 16/14; H04W 76/025; H04W 88/10; H04B 7/18508; H04B 17/009; G01S 19/23; G01S 5/0242; G08B 21/0277; H04L 1/0003; H04L 1/1893; H04L 2025/03414; H04L 25/03343; H04H 20/72
USPC ........... 455/3.02, 7, 9, 11.1, 12.1, 427, 422.1, 455/430, 446; 370/328, 329, 316, 252
See application file for complete search history.

(56) References Cited

U.S. PATENT DOCUMENTS

| | | | |
|---|---|---|---|
| 8,392,783 B2 * | 3/2013 | Kang et al. ............... | 714/748 |
| 2002/0154055 A1 | 10/2002 | Davis et al. | |
| 2006/0262222 A1 | 11/2006 | Monnier et al. | |
| 2008/0060024 A1 | 3/2008 | Decanne | |
| 2009/0007189 A1 | 1/2009 | Gutknecht et al. | |
| 2009/0113492 A1 | 4/2009 | Norin et al. | |
| 2010/0272038 A1 * | 10/2010 | Hamalainen et al. ......... | 370/329 |
| 2013/0148571 A1 * | 6/2013 | Miller .......................... | 370/316 |
| 2014/0269491 A1 * | 9/2014 | Edge ........................... | 370/328 |

FOREIGN PATENT DOCUMENTS

| EP | 1494353 A3 | 1/2006 |
| WO | 2009143082 A1 | 11/2009 |
| WO | 2011033342 A1 | 3/2011 |

OTHER PUBLICATIONS

European Search Report for EP 12003194 dated Aug. 24, 2012.

* cited by examiner

*Primary Examiner* — Sujatha Sharma
(74) *Attorney, Agent, or Firm* — McAndrews, Held & Malloy, Ltd.

(57) ABSTRACT

A satellite reception assembly may receive signals on a block of frequencies that encompasses channels of one or more wireless networks. The satellite reception assembly may convey information about signals received on the block of frequencies to a centralized location which may utilize the information to determine characteristics, such as coverage area and/or usage, of the wireless network(s). Additionally or alternatively, such information from a plurality of satellite reception assemblies may be aggregated and made available to third parties which may use the aggregate information, in combination with knowledge about the wireless network(s), to determine characteristics of the wireless network(s).

20 Claims, 11 Drawing Sheets

| Location | Channel | Characteristic(s) |
|---|---|---|
| Loc$_1$ | Ch$_1$ | XXX |
| ⋮ | ⋮ | |
| Loc$_1$ | Ch$_M$ | XXX |
| Loc$_2$ | Ch$_1$ | XXX |
| ⋮ | ⋮ | |
| Loc$_2$ | Ch$_M$ | XXX |
| ⋮ | ⋮ | |
| Loc$_N$ | Ch$_M$ | XXX |

FIG. 6A

| Location | Channel | Characteristic(s) | | | | |
|---|---|---|---|---|---|---|
| | | T0 | T1 | T2 | ••• | TZ |
| Loc$_1$ | Ch$_1$ | x | x | x | | x |
| ⋮ | ⋮ | | | | | |
| Loc$_1$ | Ch$_M$ | x | x | x | ••• | x |
| Loc$_2$ | Ch$_1$ | x | x | x | | x |
| ⋮ | ⋮ | | | | | |
| Loc$_2$ | Ch$_M$ | x | x | x | ••• | x |
| ⋮ | ⋮ | | | | | |
| Loc$_N$ | Ch$_M$ | x | x | x | ••• | x |

FIG. 6B

| Location | Base Station IDs | Base Station characteristic(s) | ... | Client IDs | Client characteristic(s) |
|---|---|---|---|---|---|
| $Loc_1$ | X, X, X, ... | X, X, X, ... | | X, X, X, ... | X, X, X, ... |
| $Loc_2$ | X, X, X, ... | X, X, X, ... | | X, X, X, ... | X, X, X, ... |
| $Loc_N$ | X, X, X, ... | X, X, X, ... | | X, X, X, ... | X, X, X, ... |

FIG. 6C

MULTI-STANDARD COVERAGE MAP GENERATION

INCORPORATION BY REFERENCE

This patent application makes reference to:
U.S. patent application Ser. No. 13/485,003 entitled "Multi-Layer Time-Interleaved Analog-to-Digital Convertor (ADC)" and filed on May 31, 2012;
U.S. patent application Ser. No. 13/336,451 entitled "Method and Apparatus for Broadband Data Conversion" and filed on Dec. 23, 2011;
U.S. patent application Ser. No. 13/326,125 entitled "System and Method in a Broadband Receiver for Efficiently Receiving and Processing Signals" and filed on Dec. 14, 2011; and
U.S. Provisional Patent Application Ser. No. 61/532,098 entitled "Method and Apparatus for Spectrum Monitoring" and filed on Sep. 8, 2011.

Each of the above applications is hereby incorporated herein by reference in its entirety.

TECHNICAL FIELD

Aspects of the present application relate to wireless communications. More specifically, to a method and system for Multi-Standard Coverage Map Generation.

BACKGROUND

Existing methods and systems for determining wireless network coverage and/or usage can be inefficient and/or costly. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A method and/or system is provided for multi-standard coverage map generation via a network of satellite receivers, substantially as illustrated by and/or described in connection with at least one of the figures, as set forth more completely in the claims.

BRIEF DESCRIPTION OF THE DRAWINGS

FIGS. 6A-6C illustrate example data structures which may be populated based on data collected by one or more satellite reception assemblies.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "module" refers to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

Figure 1:
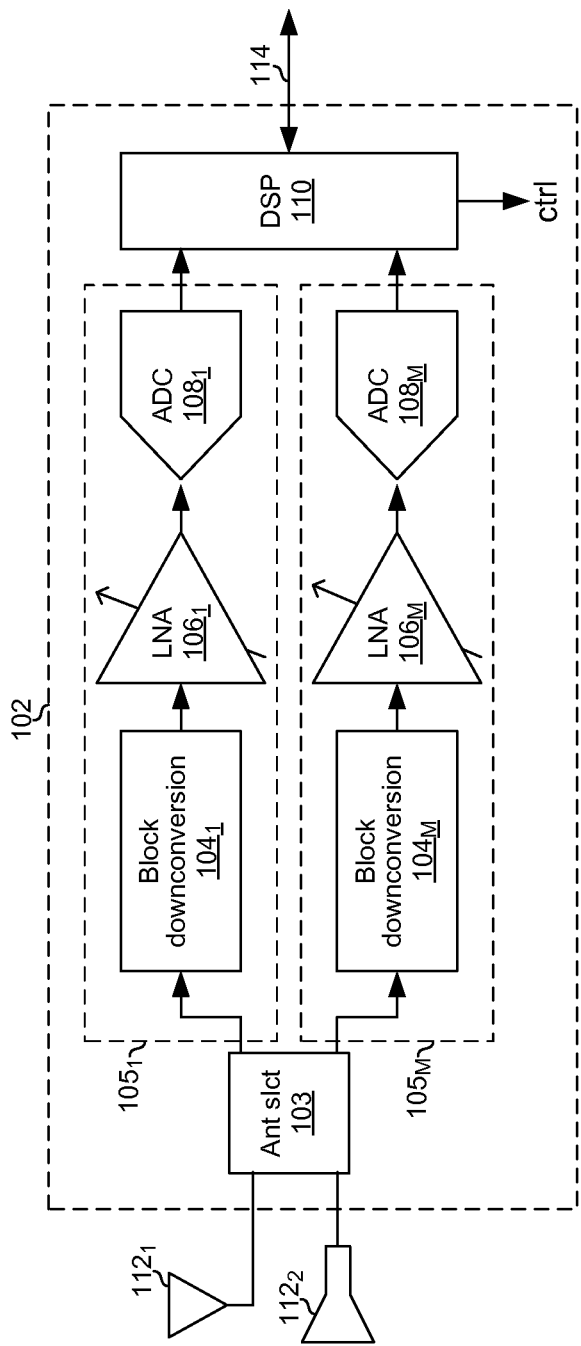
FIG. 1 depicts an example module which may be used in generating coverage and/or usage maps for wireless networks.

FIG. 1 depicts an example module which may be used in generating coverage and/or usage maps for wireless networks. The module 102 comprises a digital signal processing module 110, low-noise block-downconversion modules $104_1$-$104_M$, low-noise amplifiers $106_1$-$106_M$, analog-to-digital converters $108_1$-$108_M$, where M is an integer. The module 102 may be realized on one or more integrated circuit (e.g., silicon die) and/or one or more printed circuits boards and may reside in one or more housings. Implementations of the module 102 may be referred to as, for example, a "next generation LNB." In implementations where the signal 114 output by the module 102 utilizes Internet Protocol, the module may be referred to as an "IP-LNB."

Each downconversion module $104_m$ (m being an integer between 1 and M) may be operable to downconvert a block of frequencies from a higher frequency band to a lower-frequency band. In an example implementation, each module $104_m$ may downconvert an approximately 1 GHz-wide block of frequencies from the K and/or Ka band to the L band. Which block of frequencies is downconverted and to what frequency the block is downconverted may be determined by the frequency of one or more oscillators (not shown) of the module 102, the frequencies of which may be dynamically configurable (e.g., via one or more control signals output by the DSP module 110) during operation of the module 102 (i.e., which the module 102 is receiving and processing signals of one or more wireless networks).

The antenna select module 103 may control which of one or more antennas 112 are coupled to which of the signal processing paths Each LNA $106_m$ may be operable to apply a gain to the signal output by module $104_m$ to generate the analog signal input to ADC $108_m$. The gain may be variable and may be dynamically controlled during operation of the module 102 (e.g., based on feedback from the DSP module 110).

Each ADC $108_m$ may be operable to digitize the signal from LNA $106_m$ to generate a corresponding digital signal output to the DSP module 110. In an example implementation, each ADC $108m$ may have sufficient bandwidth to concurrently digitize the entire downconverted block of frequencies. Each ADC $108m$ may, for example, comprise an ADC as disclosed in U.S. patent application Ser. No. 13/485,003 and/or as disclosed in U.S. patent application Ser. No. 13/336,451, each of which in incorporated herein by reference above.

The DSP module 110 may be operable to process the signals received from the ADCs $108_1$-$108_M$ to select and output one or more of a plurality of frequency division multiplexed, time division multiplexed, and/or code division multiplexed channels present in the digitized blocks of frequencies output by the ADCs $108_1$-$108_M$. The channels may correspond to any number and/or type of wireless technologies. For example, a first one of the channels may be a satellite broadcast channel, a second one of the channels may be a cellular channel, a third one of the channels may be a Wi-Fi channel, a fourth one of the channels may be a WiMAX channel, and a fifth one of the channels may be a WiGig channel.

The module 102 may be dynamically configured during operation to allocate and reallocate the paths $105_1$-$105_M$ among blocks of frequencies over time.

An example implementation is described in the next two paragraphs.

During time interval T1, one or more clients of the module 102 (e.g., a television or set-top-box/gateway) may desire one or more satellite television channel. Accordingly, during time interval T1, the antenna $112_2$ (e.g., a feed horn and parabolic reflector) may receive a ~1 GHz block of frequencies in the K band, and convey that block of frequencies to module $104_1$ which may convert the block of frequencies to L band. The LNA $106_1$ may then amplify the ~1 GHz-wide L-band signal, the ADC $108_1$ may digitize the ~1 GHz-wide L-band signal, and the DSP module 110 may process the digitized signal to select the desired satellite television channel(s) for output on the connection 114. During an immediately subsequent interval, time interval T2, it may be desired to characterize coverage and/or usage of a wireless network. Accordingly, the module 102 may be configured to receive one or more frequency blocks encompassing one or more channels of the wireless network and convey information about the channel(s) to an analyzer (which may, for example, be collocated with the module 102 and/or be connected to the module 102 via one or more wired, wireless, and/or optical links).

If a channel of the wireless network to be characterized is within the block of frequencies already being processed by path $105_1$ during time interval T1, the DSP module 110 may select that channel for output to the analyzer while continuing to select the satellite television channels for output to the client. If the first wireless network uses a channel that is not within the first block of frequencies already being processed by path $105_1$, then the antenna select module 103 and path $105_2$ may be configured to select an antenna (e.g., antenna $112_1$) that receives a second block of frequencies in which the desired channel lies. The antenna that receives the first block of frequencies may also receive the second block of frequencies, or a different antenna may be selected for receiving the second block of frequencies. The second block of frequencies may be upconverted or downconverted by module $104_2$ (e.g., to the same block of frequencies output by module $104_1$). The output of module $104_2$ may be amplified by LNA $106_2$ and digitized by ADC $108_2$. The DSP module 110 may select the channel from the digital signal output by ADC $108_2$, and output the channel on the connection 114 while concurrently continuing to select the desired satellite television channel(s) selected from the signal output by ADC $108_1$.

In an example implementation, a path $105_m$ may occasionally and/or periodically be allocated to receiving a block of frequencies containing one or more channels of a wireless network to be characterized. Information about the received channel(s) may then be periodically and/or occasionally communicated to an analyzer which may generate coverage and/or usage maps based the channel information received from one or more instances of the module 102. The generated coverage and/or usage maps may then be made available to network operators associated with the characterized wireless networks.

Channel information may be conveyed to an analyzer as, for example, time-domain information in the form of one or more of samples of the channel(s) output by one or more the ADCs $108_1$-$108_M$. Additionally or alternatively, channel information may be conveyed to an analyzer as, for example, frequency domain information in the form of a frequency spectrum generated by performing a Fast Fourier Transform (FFT) on samples output by one or more of the ADCs $108_1$-$108_M$. Additionally or alternatively, channel information may be conveyed to an analyzer as symbols, bits of data, and/or other information recovered from the channel after processing (e.g., demodulation, decoding, etc.) by the DSP module 110.

Figure 2:
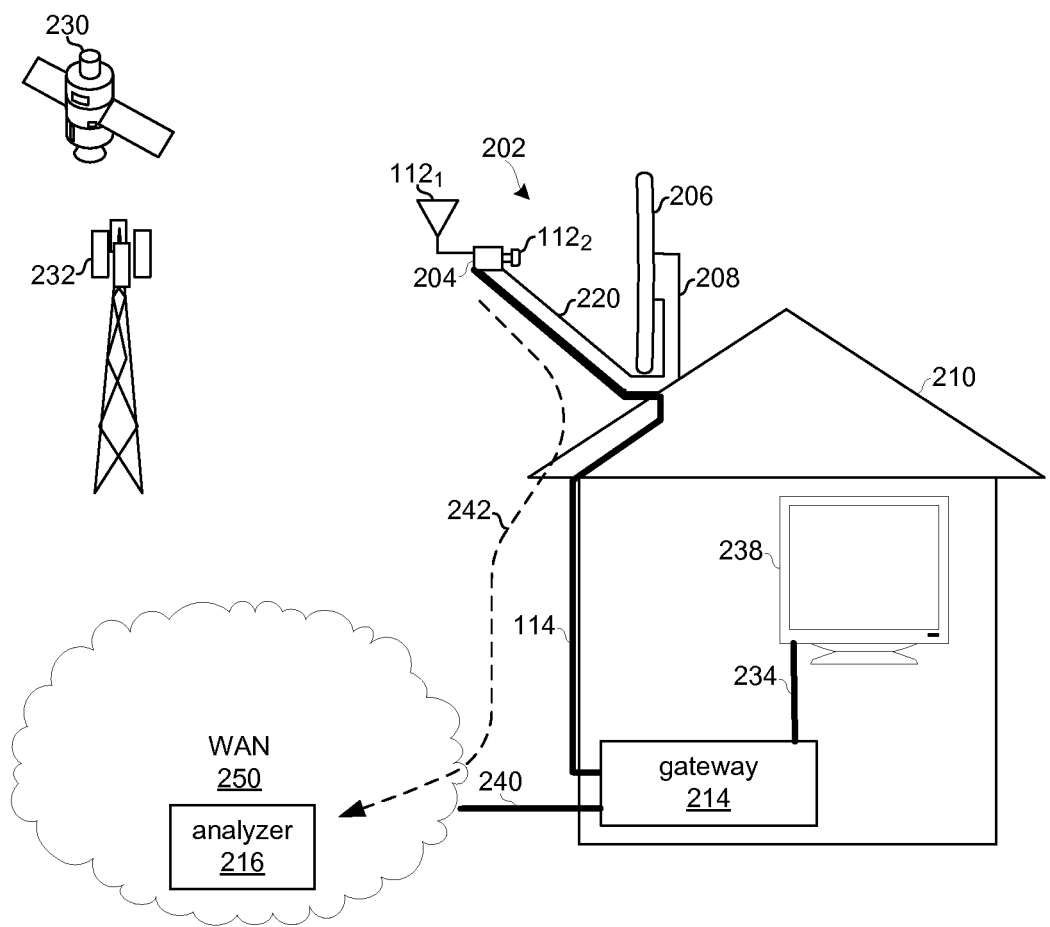
FIG. 2 depicts an example implementation where the system of FIG. 1 is mounted on customer premises.

FIG. 2 depicts an example implementation where the system of FIG. 1 is mounted on customer premises. Shown in FIG. 2 is a satellite reception assembly 202, a gateway 214, and an analyzer module 216. The satellite reception assembly 202 communicates with the gateway 214 via a connection over cable(s) 114 and the gateway 214 communicates with the WAN 250 via broadband connection 240. In the example implementation depicted, the satellite reception assembly 202 comprises a parabolic reflector 206 and feed horn (which corresponds to antenna $112_2$ of FIG. 1), and a subassembly 204 mounted (e.g., bolted or welded) to a support structure 208. The support structure 208 in turn, comprises a boom 220 and attaches (e.g., via bolts) to the premises 210 (e.g., to the roof). In another example implementation, rather than a parabolic dish and feed horn, the satellite reception assembly may comprise an array of antenna elements and/or receive modules, the outputs of which may be combined for satellite signal reception.

In an example implementation, the module 102 resides in the subassembly 204. In another example implementation, various components of the module 102 may be mounted to the premises separate from the satellite reception assembly 202 (e.g., connected via wired and/or wireless connections), but may still be part of the "outdoor unit." In another example implementation, all or a portion of the components of the module 102 may be part of the gateway 214 (or "indoor unit"). Furthermore, although the analyzer 216 is depicted as residing in the WAN 250, in other implementations, all or a portion of the functions performed by the analyzer 216 may be implemented in the module 102 (e.g., in the DSP module 110) and/or in the gateway 214.

The gateway 214 may transmit and/or receive data to and/or from the module 102 via cable(s) 114, the WAN 250 via broadband connection 240, and/or one or more client devices 238 via one or more connections 234. For data from the module 102 to a client device 238, the gateway 214 may, for example, recover the data from Ethernet frames received over the cable(s) 114 and output the data to the client device 238. For data from the client device 238 and/or gateway 214 to the module 102, the gateway 214 may, for example, encapsulate the data in one or more Ethernet frames and output the frames onto the cable(s) 114. For data between the WAN 250 and the module 102, the gateway 214 may perform OSI layer-2 switching and/or OSI layer-3 routing. Although the implementation shown in FIG. 2 uses wired connections between the gateway 214 and module 102, and between the gateway 214 and WAN 250, other implementations may utilize wireless connections.

The analyzer module 216 may be operable to characterize wireless channels. Characterizing a channel may comprise, for example, measuring signal strength of the channel during one or more time intervals, measuring signal-to-noise ratio of the channel during one or more time intervals, measuring transmissions per unit time on the channel, measuring transmitted data per unit time on the channel, measuring number of unique devices transmitting on the channel during one or more time intervals, measuring symbol error rates, bit error rates, or performing any other desirable measurement or analysis of the wireless channel. How a particular channel is characterized may depend on the wireless technology used on the channel and the extent to which analyzer 216 supports the physical layer, network layer, and/or higher layer protocols of that wireless technology. For example, where only one wireless network uses a particular frequency channel, the analyzer 216 may be operable to characterize the channel based purely on frequency spectrum analysis. Conversely, where a first wireless network and second wireless network are concurrently sharing a particular frequency channel, the analyzer 216 may need the capability of looking at more than just the physical layer signals. For example, the analyzer 216 may need the capability of demodulating signals on of at least one of the networks in order to attribute signals on the channel to one of the networks.

In an example implementation, the analyzer 216 may be operated by, or various functions of the analyzer 216 may be performed by, the satellite provider that operates the satellite reception assembly 202. In such an implementation, the satellite provider may, for example, sell information collected and/or generated by the analyzer to, for example, other network operators.

In an example implementation, the analyzer 216 may be operated by, or various functions of the analyzer 216 may be performed by, a network operator associated with a wireless network to be characterized. In such an implementation, the network operator may, for example, subscribe to the channel information data output by the satellite reception assemblies 202 operated by the satellite provider.

In an example implementation, the analyzer 216 may be operated by, or various functions of the analyzer 216 may be performed by, a third party service provider. In such an implementation, the third-party service provider may, for example, pay the satellite provider for access to the channel information output by the satellite reception assemblies, analyzes the channel information, and then sells the results of the analysis to wireless network operators.

The module 102 may be configured to receive signals of one or more channels of one or more wireless networks for the purpose of relaying the signals (or data recovered from the signals) to other devices that desire to consume data carried on the channel(s). For example, the module 102 may be configured to receive signals of one or more channels of a satellite broadcast network associated with satellite 230 for the purpose of conveying the signals (or data recovered from the signals) to the client device 238 for consumption (e.g., so a user of the client 238 can watch a television program). As another example, the module 102 may be configured to receive signals of a channel of a wireless network (e.g., a Wi-Fi, cellular, WiGig, or WiMAX network) handled by the base station 232 for the purpose of conveying the signals (or data recovered from the signals) to the client device 238 for consumption (e.g., so a user of the client device 238 can view a webpage).

Additionally or alternatively, the module 102 may be configured to receive signals of one or more channels of one or more wireless networks for the purpose of characterizing the channel(s). The channel characteristics may be used to characterize the wireless network(s) as a whole. Characterizing a channel may comprise sampling (e.g., via one or more of ADC $108_i$) signals on the channel during one or more time intervals and storing the samples for further processing. Characterization may comprise performing measurements and/or analyses on the samples in the time domain and/or converting the samples to the frequency domain (e.g., via a Fast Fourier Transform (FFT) and performing measurements and/or analyses in the frequency domain.

Which channels of which wireless networks the module 102 is configured to receive and process may depend on control signals received wirelessly and/or via the cable(s) 114. Such control signals may be received from, for example, the gateway 214 and/or from the analyzer 216.

In an example implementation, the module 102 may be configured such that signals of multiple wireless networks and/or multiple channels of a particular wireless network are received and digitized concurrently by one or more of the receive paths $105_1$-$105_M$. In such an implementation, the DSP module 110 may then dynamically select which channels are conveyed to which devices. For example, the DSP module 110 may select a satellite broadcast channel present in the digitized received signal for output to the client device 238 and may concurrently select a channel of a cellular network for output to the analyzer 216 (as illustrated by arrow 242).

Figure 3:
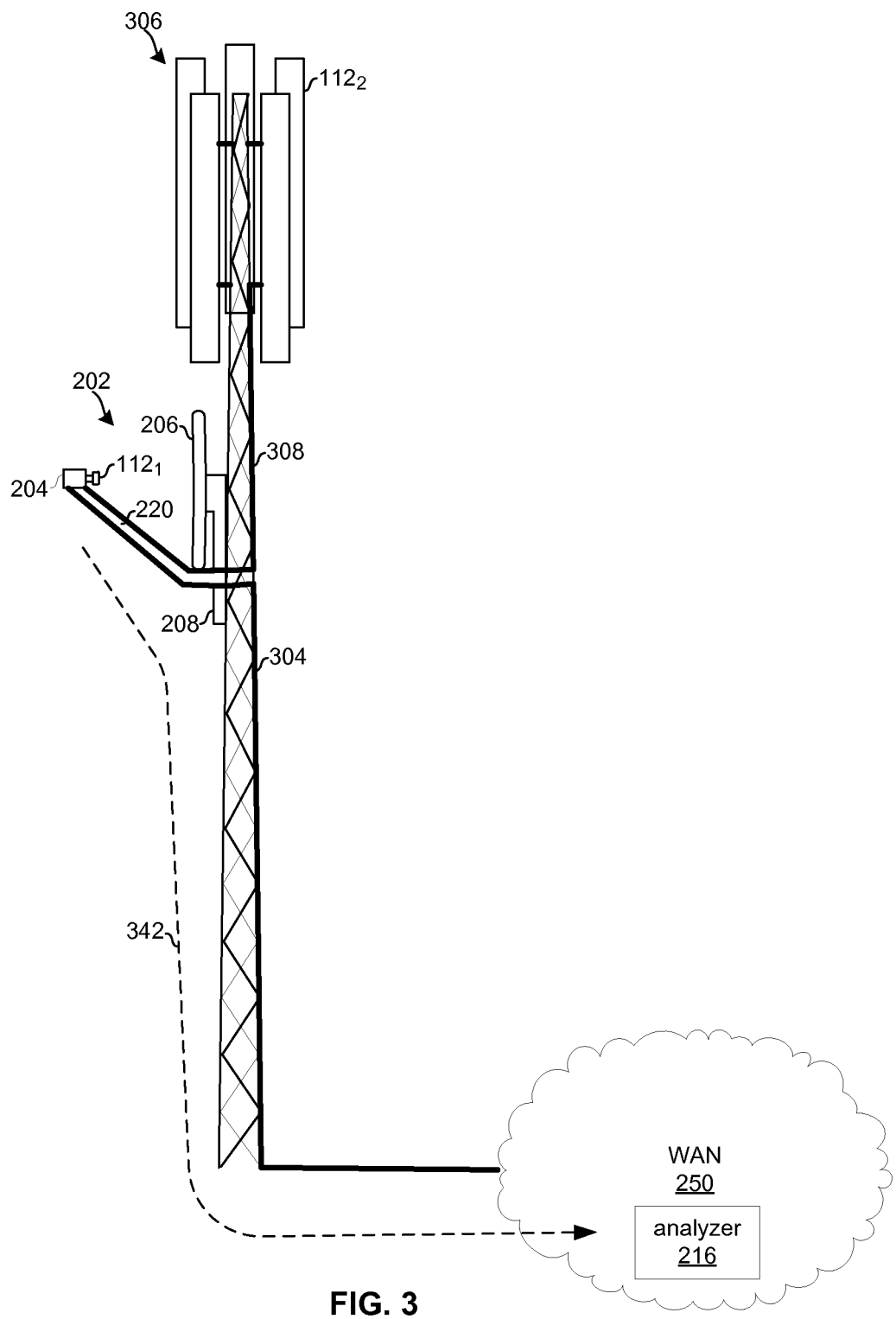
FIG. 3 depicts an example implementation where the system of FIG. 1 is mounted to a cellular tower.

FIG. 3 depicts an example implementation where the system of FIG. 1 is mounted to a cellular tower. Shown in FIG. 3 is a satellite reception assembly 202, an analyzer module 216, and a cellular tower 306. The satellite reception assembly 202, the WAN 250, and the analyzer 216 may be as described above with reference to FIG. 2.

In an example implementation, the module 102 resides in the subassembly 204. In another example implementation, various components of the module 102 may be mounted on or near the cellular tower 306 separate from the satellite reception assembly 202 (e.g., connected via wired and/or wireless connections. Furthermore, although the analyzer 216 is depicted as residing in the WAN 250, in other implementations, all or a portion of the functions performed by the analyzer 216 may be implemented in the module 102 (e.g., in the DSP module 110) and/or in separate modules mounted on or near the cellular tower 306.

In an example implementation, one or more antenna elements of the cellular tower 306 may be coupled to the module 102 via a cable 308 and may function as one or more of the antennas 112 described above with reference to FIG. 1. The module 102 may communicate channel information to the analyzer 216 via a one or more cables 304 (or wireless connections) as illustrated by arrow 342.

Figure 4:
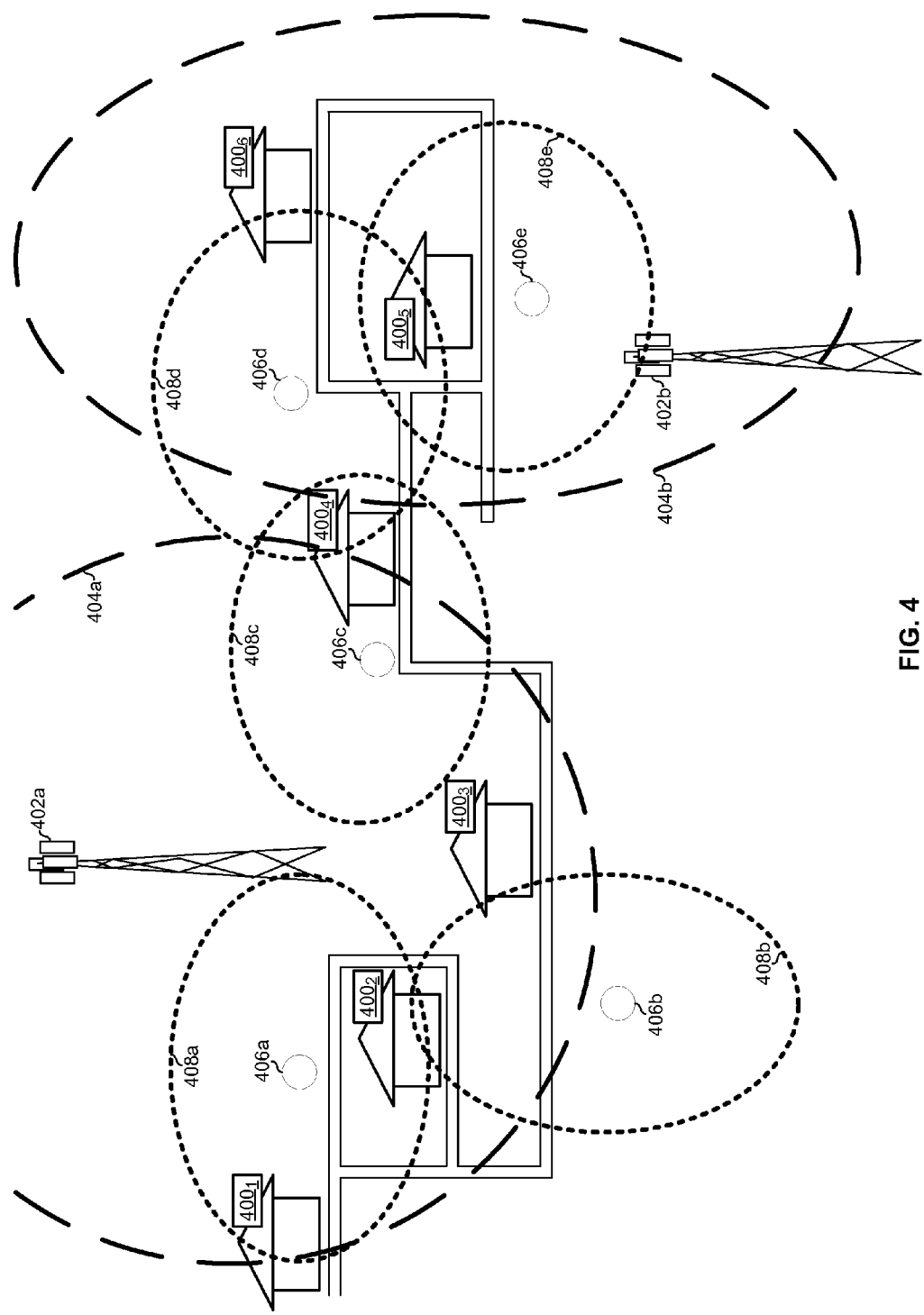
FIG. 4 is a diagram illustrating characterization of a plurality of wireless network using deployed satellite reception assemblies.

FIG. 4 is a diagram illustrating characterization of a plurality of wireless networks using deployed satellite reception assemblies. Shown in FIG. 4 are base stations 402a and 402b of a first wireless network (e.g., a cellular network), base stations 406a-406e of a second wireless network (e.g., a Wi-Fi network), and satellite reception assemblies $400_1$-$400_6$, each of which may be, for example, an instance of the satellite reception assembly 202. The base stations 402a and 402b cover areas 404a and 404b, respectively, using one or more wireless channels. Similarly, the base stations 406a-406e cover areas 408a-408e, respectively, using one or more wireless channels.

In operation, the satellite reception assemblies $400_1$-$400_6$ may receive signals on one or more channels of the first wireless network and/or on one or more channels of the second wireless network. The satellite reception assemblies $400_1$-$400_6$ may then report information about the channels to a centralized module which may use the channel information to characterize the channels individually, the first wireless network as a whole, and/or the second wireless network as a whole. The centralized module may be, for example, an analyzer 216 residing in one of the satellite reception assemblies $400_1$-$400_2$, collocated with one of the satellite reception assemblies, or residing on one or more servers of a WAN that are reachable via broadband connections that serve the satellite reception assemblies $400_1$-$400_2$.

In an example implementation, channel information reported by the satellite reception assembly $400_1$ may indicate that it can receive signals from base station 406a and base station 402a and may further indicate characteristics of the received signals such as signal strength, SNR, error rate, etc. The other satellite receptions assemblies $400_2$-$400_6$ may report similar information about signals of the first and/or second wireless network that they can receive. The analyzer may then use the reported channel information, along with information about the location of the satellite reception assemblies $400_1$-$400_6$ (e.g., available in a data structure and/or reported by the satellite reception assemblies $400_1$-$400_6$ along with the channel information) to generate coverage maps for the first and second wireless networks. Generation of the coverage maps may also utilize known information about the first and second wireless network such as location of the base stations 406a-406e and 402a and 402b.

In an example implementation, channel information reported by the satellite reception assemblies $400_1$-$400_6$ may indicate the presence of client devices on the first and/or second wireless network. For example, the satellite reception assemblies may be capable of demodulating and decoding packet headers that identify a source of transmissions on the first wireless network and/or the second wireless network. In such an instance, the reported channel information from a satellite reception assembly $400_j$ (j being an integer between 1 and 6) could indicate how many devices it heard on a particular network during one or more particular time intervals, an identifier associated with the devices heard on a particular network during one or more particular time intervals, etc. This reported channel information may be utilized for generating maps and/or charts that indicate network usage vs. time.

In an example implementation, each of the satellite reception assemblies $400_1$-$400_6$ may sample, during one or more time intervals, an entire block of frequencies which encompasses one or more channels of the first wireless network and/or one or more channels of the second wireless. The samples, and/or the results of performing an FFT on the samples, from a plurality of the satellite reception assemblies $400_1$-$400_6$ may be aggregated by the analyzer 216 and the aggregate data may be made available to the network operators that operate the wireless networks. The network operators can use this aggregate data in combination with their knowledge of their own network (e.g., knowledge of base station locations, channels on which various devices of the network operate, time slots allocated to various transmissions on the network, etc.) to determine coverage and/or usage of their network, to detect network outages, to plan their network, etc. In this manner, the network satellite reception assemblies $400_1$-$400_6$ may eliminate the need for the network operators to send out service technicians to measure network performance in locations where one of the satellite reception assemblies $400_1$-$400_6$ resides.

Figure 5:
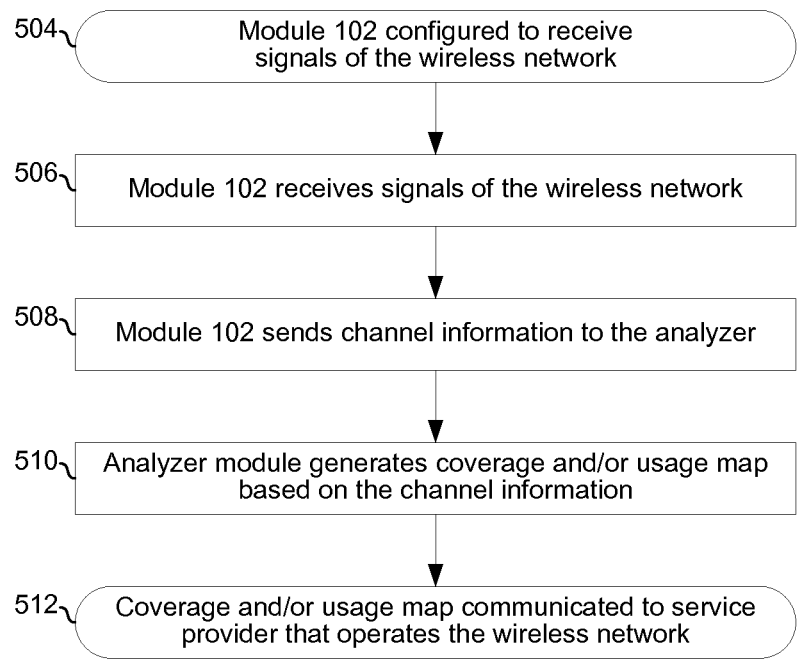
FIG. 5 is a flowchart illustrating an example process for determining network characteristics based on information collected via one or more satellite reception assemblies.

FIG. 5 is a flowchart illustrating an example process for determining characteristics of a wireless network based on information collected via one or more satellite reception assemblies. In step 504, a module 102 (e.g., residing in a satellite reception assembly) is configured to receive one or more channels of a wireless network that is to be characterized. In step 506, the module 102 receives signals on the one or more channels. In step 508, the module 102 conveys information about the signals received on the one or more channels to an analyzer. This may comprise for example, forwarding the raw signals, in analog or digital form, to the analyzer; converting the received signals to corresponding frequency domain information and conveying the frequency domain information to the analyzer; and/or processing the received signals (e.g., demodulating and/or decoding at least a portion of the signals) and conveying the recovered symbols or data to the analyzer. In step 510, the analyzer uses the received channel information from the module 102, and possibly from other instances of the module 102, to determine characteristics of the network such as network coverage and/or network usage. In step 512, the analyzer may make the determined characteristics available, possibly in exchange for payment, to interested parties (e.g., the network operator that operates the wireless network, its competitors, and/or news agencies that report on the wireless industry, etc.).

Using channel information from a one or more satellite reception assemblies, an up-to-date and comprehensive database (or other data structure) of signal sources, the location of such sources (e.g., using GPS, signal strength measurement, triangulation such as might be performed by satellite reception assemblies based on time-of-arrival of signal markers such as preambles or pilot symbols, and/or other methods), and other characteristics such as, for example, protected/unprotected status, frequency offset, frequency of transmission, and/or estimated power levels can therefore be created and maintained in real-time. The database can be made available to, for example, other databases, entities, devices, mobile applications, desktop applications, etc. Such a database may be used, for example, for purposes such as determining nearby hotspots, positioning, time synchronization, hand-off, frequency allocation, frequency planning, or coverage planning and analysis. For example, such a database could provide a wireless network operator with information regarding what spectrum is currently available in which locations. As another example, such a database could be used to track statistical spectral usage over time to allow more intelligent spectrum allocation, or time-varying licensing/sharing/leasing/auctioning of spectrum over time to one or more service operators or individual device users. For example, a network operator may analyze its network, determine locations and/or times of low usage and offer to lease bandwidth in those locations and/or during those times to other network operators. The offer may be in the form of an auction where multiple network providers could bid on the low-usage times and/or locations. Such determination of resources to be licensed may be automated using a web-based system that network operators could log into to see network resources that are available for lease or purchase.

FIGS. 6A-6C illustrate example data structures which may be populated based on data collected by one or more satellite reception assemblies. In FIG. 6A, the data structure comprises M×N (where M an N are both integers) records, with each record storing one or more characteristics (e.g., SNR, frequency offset, power levels, number of devices using the channel, etc.) of a particular channel in a particular location. In the example implementation shown in FIG. 6A, there are N satellite reception assemblies in a corresponding N locations, with each satellite reception assembly collecting data on M (an integer) channels. The locations could be identified by, for example, GPS coordinates, street address, and/or a unique identifier associated with the satellite reception assembly located there. In FIG. 6B, the data structure comprises M×N records, with each record storing characteristics for a corresponding channel during each of Z (an integer) time intervals. In FIG. 6C, the data structure comprises N records, with each record storing a list of base stations detected by the satellite reception assembly in a particular location, respective characteristics of those base stations and/or their transmissions, a list of client devices detected by the satellite reception assembly in a particular location, and respective characteristics of those client devices and/or their transmissions.

FIGS. 7A-7D illustrate examples of coverage maps which may be generated based on data collected by one or more satellite reception assemblies. For illustration, example maps corresponding to the network shown in FIG. 4 are depicted.

Figure 7A:
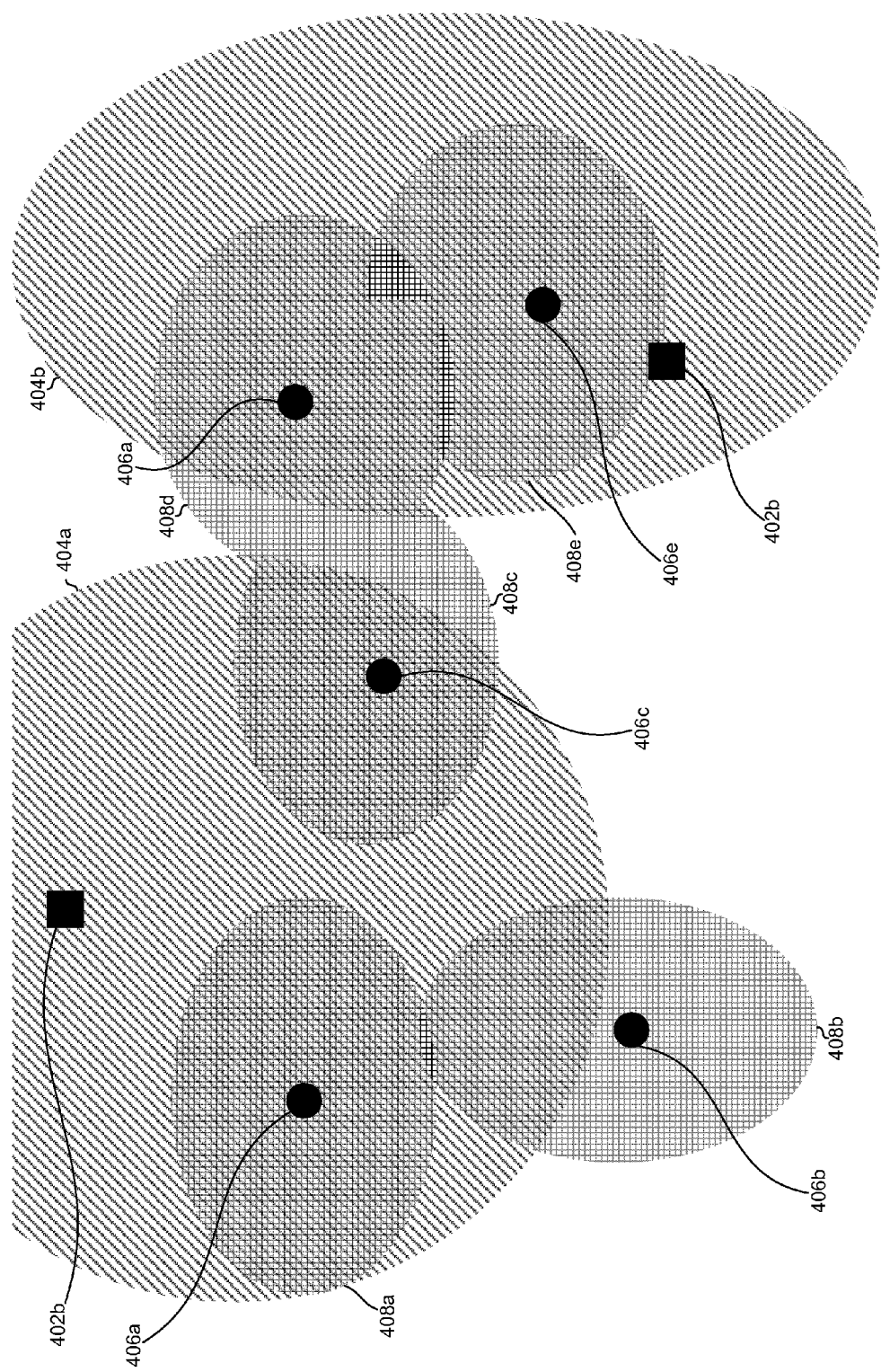
FIGS. 7A-7D illustrate examples of coverage maps which may be generated based on data collected by one or more satellite reception assemblies.

The map FIG. 7A, depicts coverage areas and base stations associated with the coverage areas. Different graphical images are used for the two wireless networks to enable distinguishing which coverage areas and which base stations belong to each network.

Figure 7B:
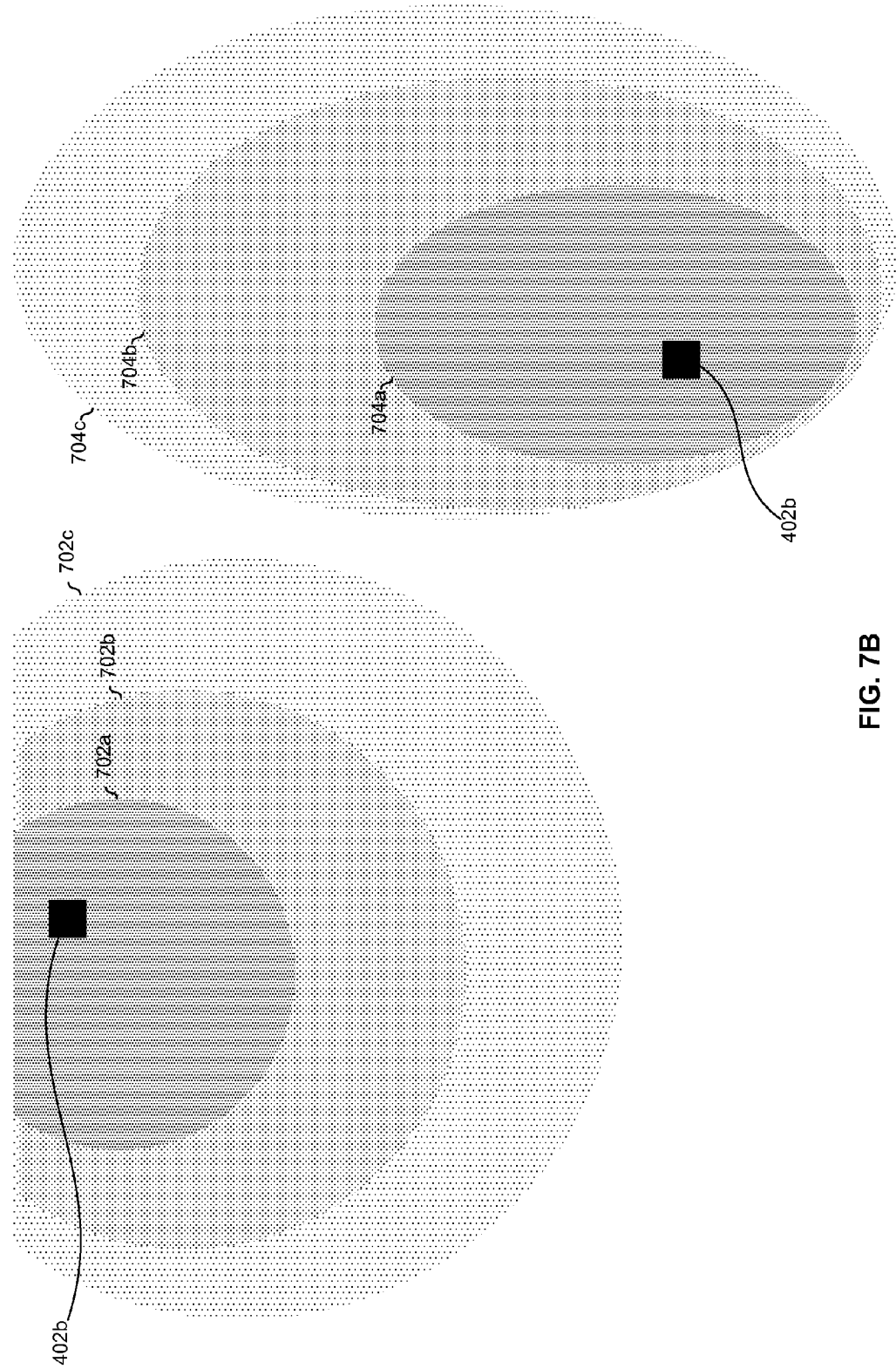

The map in FIG. 7B shows power levels for base stations of a particular wireless network (more dots per $in^2$ corresponding to higher power levels). The areas 702a and 704a corresponding to higher power level, the areas 702b and 704b corresponding to an intermediate power level, and the areas 702c and 704c corresponding to a lower power level.

Figure 7C:
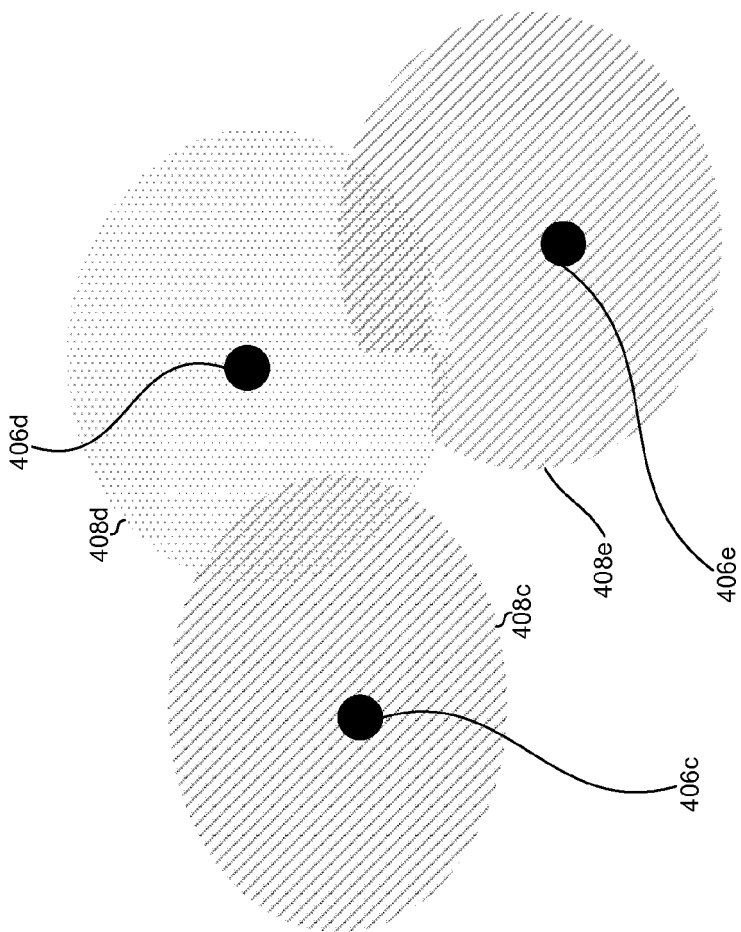
Figure 7C:
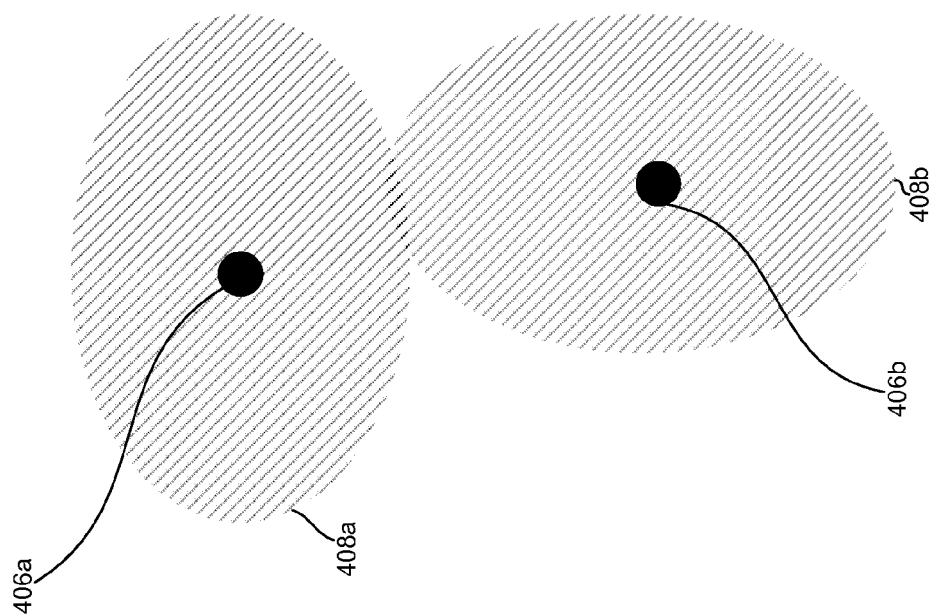

The map in FIG. 7C shows which channels each base station of a particular wireless network is transmitting on. In the example implementation, each of base stations 406a-406c, 406d are using a first channel (indicated by cross-hatching) and the base station 406d is using a second channel (indicated by dots).

Figure 7D:
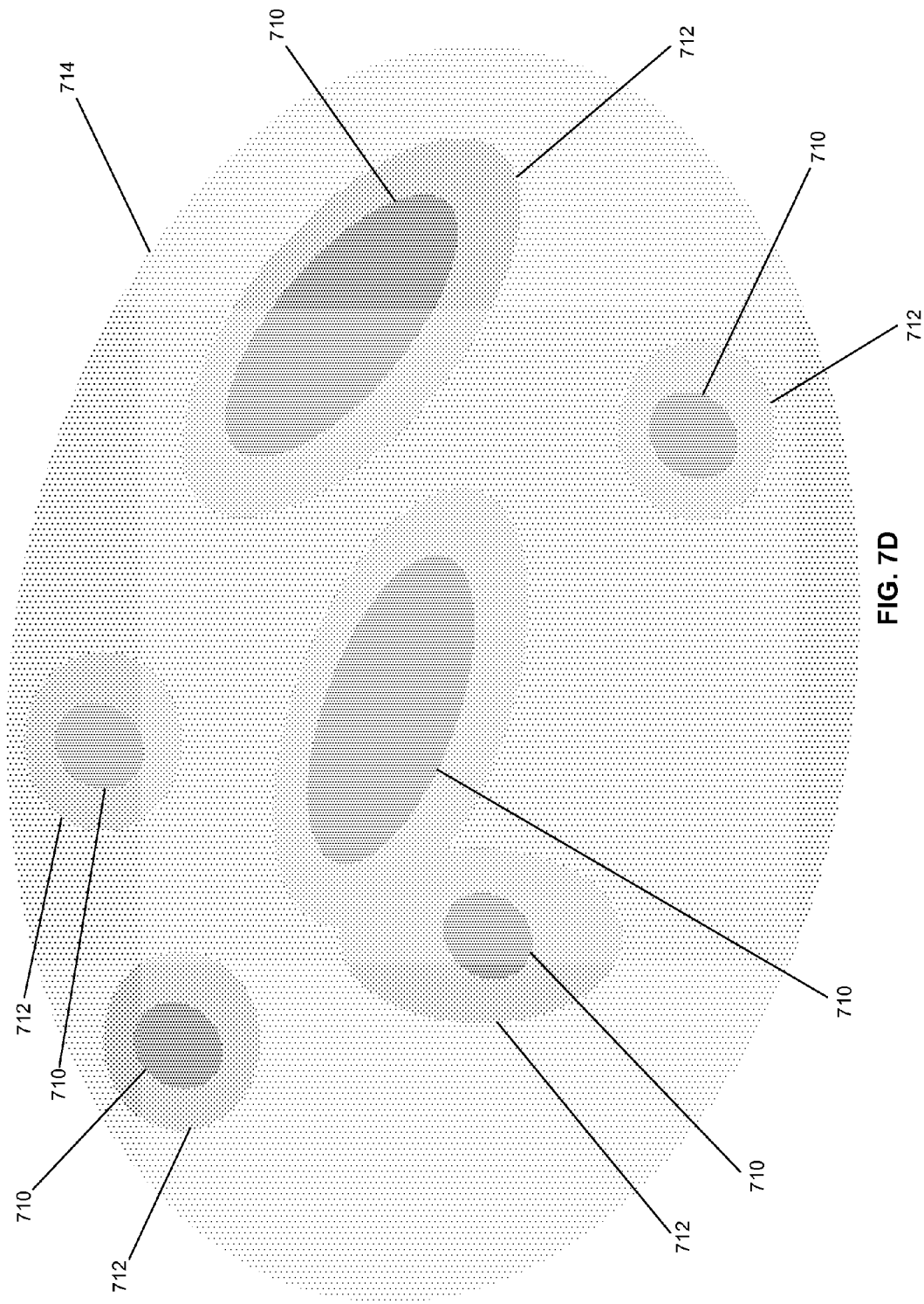

The map in FIG. 7D shows wireless device population density, with areas 710 being areas having a higher number of wireless devices per square meter, areas 712 being areas having an intermediate number of wireless devices per square meter, and areas 714 being areas having a lower number of wireless devices per square meter. The devices counted may be, for example, network specific or across all wireless networks present in the area.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multi-standard coverage map generation.

Accordingly, the present method and/or apparatus may be realized in hardware, software, or a combination of hardware and software. The present method and/or apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A system comprising:
   one or more circuits operable to:
   receive a block of frequencies;
   processes said received block of frequencies to recover signals of a first wireless network, said first wireless network being a satellite broadcast network;
   transmit said signals of said first wireless network to a receiver;
   process said received block of frequencies to recover signals of a second wireless network; and
   transmit said signals of said second wireless network to an analyzer that is operable to determine coverage and/or usage of said second wireless network.

2. The system of claim 1, wherein said one or more circuits reside in a satellite reception assembly.

3. The system of claim 2, wherein said satellite reception assembly is intended for installation at a satellite subscriber's home or office.

4. The system of claim 2, wherein said satellite reception assembly comprises a parabolic reflector, a feed horn, and a low-noise block downconverter mounted to a rigid support structure.

5. The system of claim 1, wherein said second wireless network is a cellular, WiMAX, WiGig, or Wi-Fi network.

6. The system of claim 1, wherein said one or more circuits are operable to select among a plurality of antennas for receiving said block of frequencies.

7. A method performed by a satellite reception assembly, the method comprising:
   receiving signals in a first frequency band, said frequency band encompassing signals of a plurality of wireless networks;
   analyzing said received signals to determine coverage and/or usage of each of said plurality of wireless networks; and
   making said determined coverage and/or usage available to one or more network operators associated with said plurality of wireless networks.

8. The method of claim 7, wherein said satellite reception assembly comprises a parabolic reflector, a feed horn, and a low-noise block downconverter mounted to a rigid support structure.

9. The method of claim 7, wherein said satellite reception assembly provides satellite television service to a home or office at which it is installed.

10. The method of claim 7, wherein said plurality of wireless networks comprises one or more of the following: a satellite broadcast network, a cellular network, a Wi-Fi network, a WiMAX network, and a WiGig network.

11. A system comprising:
    one or more circuits for use in a satellite reception assembly, said one or more circuits being operable to:
    receive a channel of a first wireless network, process said received channel of said first wireless network, and transmit said processed received channel of said first wireless network to a receiver, wherein said first wireless network is a satellite broadcast network; and receive a channel of a second wireless network and output information about said channel of said second wireless network to an analyzer that is operable to determine coverage and/or usage of said second wireless network.

12. The one or more circuits of claim 11, wherein said satellite reception assembly comprises a parabolic reflector, a feed horn, and a low-noise block downconverter mounted to a rigid support structure.

13. The one or more circuits of claim 11, wherein said satellite reception assembly provides satellite television service to a home or office at which it is installed.

14. The one or more circuits of claim 11, wherein said second wireless network is one of a cellular network, a Wi-Fi network, a WiMAX network, and a WiGig network.

15. A method comprising:
receiving, from each one of a plurality of satellite reception assemblies, information about a channel of a wireless network received by said one of said plurality of satellite reception assemblies;

analyzing said channel information to determine coverage and/or usage of said wireless network.

16. The method of claim 15, wherein said satellite reception assembly comprises a parabolic reflector, a feed horn, and a low-noise block downconverter mounted to a rigid support structure.

17. The method of claim 15, wherein at least one of said plurality of satellite reception assemblies provides satellite television service to a home or office at which it is installed.

18. The method of claim 15 comprising transmitting said determined coverage and/or usage to a network operator associated with said wireless network.

19. The method of claim 16 wherein said wireless network is a cellular, Wi-Fi, WiMAX, or WiGig network.

20. The method of claim 17, comprising generating a map depicting said determined coverage and/or usage of said wireless network.

* * * * *